(12) United States Patent
Koga

(10) Patent No.: US 7,604,340 B2
(45) Date of Patent: Oct. 20, 2009

(54) WATER-BASED INK SET FOR INK-JET RECORDING

(75) Inventor: Narumi Koga, Nagoya (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 470 days.

(21) Appl. No.: 11/492,770

(22) Filed: Jul. 26, 2006

(65) Prior Publication Data

US 2007/0022902 A1  Feb. 1, 2007

(30) Foreign Application Priority Data

Jul. 26, 2005 (JP) ............................. 2005-216146
Mar. 17, 2006 (JP) ............................. 2006-074339

(51) Int. Cl.
*C09D 11/00* (2006.01)

(52) U.S. Cl. .................................. 347/100; 106/31.13

(58) Field of Classification Search ................ 347/100; 106/31.13

See application file for complete search history.

(56) References Cited

FOREIGN PATENT DOCUMENTS

| JP | 55 65269 | 5/1980 |
|---|---|---|
| JP | 2006063322 A * | 3/2006 |

* cited by examiner

*Primary Examiner*—Manish S Shah
*Assistant Examiner*—Laura E Martin
(74) *Attorney, Agent, or Firm*—Baker Botts L.L.P.

(57) ABSTRACT

Provided is a water-based ink set for ink-jet recording for reducing bleeding between a black (Bk) ink and a yellow (Y) ink and for reducing color unevenness in a portion formed by color mixing of color inks. The water-based ink set for ink-jet recording includes at least a Bk ink, a Y ink, a magenta (M) ink and a cyan (C) ink. In this configuration, the following relationships are satisfied:

$$\sigma_{1000Bk} \geq 35 \text{ mN/m};  \quad (1)$$

$$|\sigma_{30Y} - \sigma_{30Bk}| \leq 5 \text{ mN/m};  \quad (2)$$

$$\sigma_{30M} \geq 30 \text{ mN/m}, \sigma_{30C} \geq 30 \text{ mN/m};  \quad (3)$$

$$\sigma_{30Y} > \sigma_{30M}, \sigma_{30Y} > \sigma_{30C}; \text{ and}  \quad (4)$$

$$\sigma_{30Y} + \sigma_{30M} \leq 93 \text{ mN/m}, \sigma_{30Y} + \sigma_{30C} \leq 93 \text{ mN/m},  \quad (5)$$

wherein $\sigma_{30Bk}$, $\sigma_{30Y}$, $\sigma_{30M}$ and $\sigma_{30C}$ are dynamic surface tensions of the Bk ink, the Y ink, the M ink and the C ink, respectively, at a lifetime of 30 ms as measured by a maximum bubble pressure method at a measurement temperature of 25° C., and $\sigma_{1000Bk}$ is a dynamic surface tension of the black ink at a lifetime of 1,000 ms as measured by the maximum bubble pressure method at a measurement temperature of 25° C.

19 Claims, 1 Drawing Sheet

WATER-BASED INK SET FOR INK-JET RECORDING

BACKGROUND OF THE INVENTION

1. Field of the Invention

The present invention relates to a water-based ink set for ink-jet recording for reducing bleeding between a black ink (hereinafter referred to as a Bk ink) and a yellow ink (hereinafter referred to as a Y ink), and for reducing color unevenness in a portion formed by color mixing of color inks.

2. Description of the Related Art

In an ink-jet recording method, recording is performed by forming droplets of ink and causing all or a part of the formed ink droplets to adhere to a recording material such as paper. In this case, the ink droplets are formed by means of an ink ejection method such as an electrostatic attraction method, a method in which mechanical vibrations or displacements are applied to ink by use of a piezoelectric element, or a method utilizing the pressure generated when ink is heated to generate bubbles.

As an ink for ink-jet recording employed in such an ink-jet recording method, an ink has been known which is formed by dissolving or dispersing a dye or a pigment in a liquid medium formed of water and a water-soluble organic solvent.

An ink for ink-jet recording is required to have optimal performance for use in an ink-jet recording method. Specifically, for example, high print quality is required when an image is formed on recording paper. That is, the ink does not cause irregular flow along fibers of the recording paper and irregular penetration to the space between the fibers (hereinafter referred to as blurring), whereby the image has sharp edges. The ink is also required to dry rapidly and to have excellent rub fastness when an image is formed on recording paper. Further, the ink is required to be capable of being stably ejected for a long time. That is, the ink does not cause corrosion of a resin material or a metal material employed in an ink-jet head, whereby a nozzle is not clogged. In view of the above and other requirements, various improvements have been made. Moreover, in recent years, there has been an increasing demand that recording be made on ordinary paper instead of paper designed specifically for ink-jet recording in terms of cost and environmental friendliness.

However, when recording is made on ordinary paper by use of conventional inks, different colors are mixed in a boundary region in which the colors are adjacent to each other (hereinafter referred to as bleeding), resulting in a problem of deterioration in print quality. Between a Bk ink and a Y ink, this bleeding is highly noticeable since the lightness difference therebetween is large and thus is a particularly serious problem.

As a measure for solving such problems, a method has been known in which a compound such as a surfactant for enhancing penetrability is added to ink (Japanese Patent Application Laid-Open No. Sho 55-65269). According to this method, although bleeding between a Bk ink and a Y ink is improved, there is a drawback that color unevenness in a portion formed by color mixing deteriorates when color inks are employed. In order to improve the color unevenness in a portion formed by color mixing when color inks are employed, an alkyl ether of polyhydric alcohol, such as diethylene glycol butyl ether which is applied in a commercial ink for color ink-jet recording, may be added as a penetrant to the inks. However, in this case, if a large amount of an alkyl ether of polyhydric alcohol is added, bleeding between the Bk ink and the Y ink becomes serious. Therefore, in a conventional method, it has been very difficult to reduce both the bleeding between a Bk ink and a Y ink and the color unevenness in a portion formed by color mixing of color inks at the same time.

SUMMARY OF THE INVENTION

The ink set for ink-jet recording of the present invention is intended to solve the above problems. Accordingly, it is an object of the invention to prevent, even when ordinary paper is employed as a recording material, blurring of a Bk ink which is frequently employed for printing text and lines, and at the same time to reduce both bleeding between the Bk ink and a Y ink and color unevenness in a portion formed by color mixing of color inks.

The present inventor has found the following facts:

(i) In order to prevent the blurring of the Bk ink, it is effective to set the dynamic surface tension of the Bk ink at a lifetime of 1,000 ms to 35 mN/m or larger.

(ii) In order to reduce the bleeding between the Bk ink and the Y ink, it is effective to set the difference of the dynamic surface tension at a lifetime of 30 ms between the Bk ink and the Y ink to 5 mN/m or less for adjusting the penetrability of the inks into a recording material relative to each other.

(iii) If the dynamic surface tension of the Y ink at a lifetime of 30 ms is set relatively high according to (i) and (ii), the penetrability of the Y ink itself is not large enough. Thus, color unevenness is likely to occur in a portion formed by color mixing of the Y ink and a magenta ink (hereinafter referred to as an M ink) and in a portion formed by color mixing of the Y ink and a cyan ink (hereinafter referred to as a C ink). However, if the sum of the dynamic surface tension of the Y and M inks at a lifetime of 30 ms and the sum of the dynamic surface tension of the Y and C inks at a lifetime of 30 ms are set to 93 mN/m or less, the overall penetrability of the inks is enhanced in a portion formed by color mixing. Thus, color unevenness can be reduced in a portion formed by color mixing.

Accordingly, the present invention provides a water-based ink set for ink-jet recording, comprising at least a Bk ink, a Y ink, a M ink and a C ink. The water-based ink set for ink-jet recording is characterized by satisfying the following relationships:

$$\sigma_{1000Bk} \geq 35 \text{ mN/m;} \tag{1}$$

$$|\sigma_{30Y} - \sigma_{30Bk}| \leq 5 \text{ mN/m;} \tag{2}$$

$$\sigma_{30M} \geq 30 \text{ mN/m, } \sigma_{30C} \geq 30 \text{ mN/m;} \tag{3}$$

$$\sigma_{30Y} > \sigma_{30M}, \sigma_{30Y} > \sigma_{30C}; \text{ and} \tag{4}$$

$$\sigma_{30Y} + \sigma_{30M} \leq 93 \text{ mN/m, } \sigma_{30Y} + \sigma_{30C} \leq 93 \text{ mN/m,} \tag{5}$$

wherein $\sigma_{30Bk}$, $\sigma_{30Y}$, $\sigma_{30M}$ and $\sigma_{30C}$ are the dynamic surface tensions of the Bk ink, the Y ink, the M ink and the C ink, respectively, at a lifetime of 30 ms as measured by a maximum bubble pressure method at a measurement temperature of 25° C., and $\sigma_{1000Bk}$ is the dynamic surface tension of the Bk ink at a lifetime of 1,000 ms as measured by the maximum bubble pressure method at a measurement temperature of 25° C.

According to the water-based ink set for ink-jet recording of the present invention, even when ordinary paper is employed as a recording material, blurring of the Bk ink is prevented, and both bleeding between the Bk and Y inks and color unevenness of a portion formed by color mixing of color inks can be reduced at the same time.

DETAILED DESCRIPTION OF THE PREFERRED EMBODIMENTS

Figure 1:
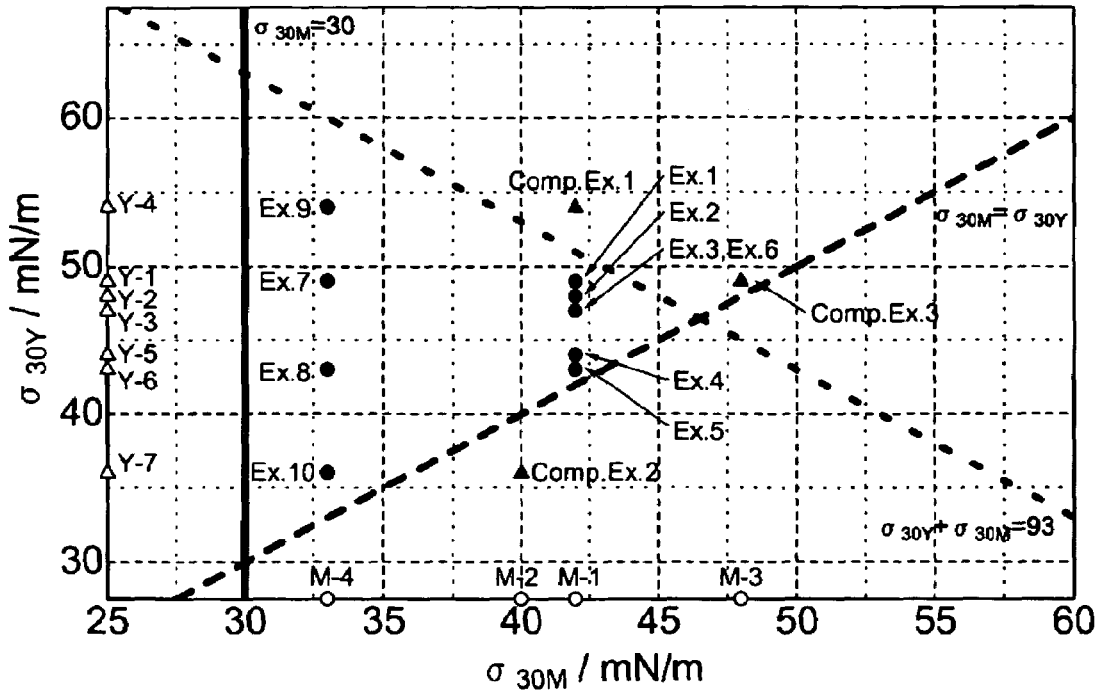
FIG. 1 is a graph showing the dynamic surface tensions of a Y ink and an M ink at a lifetime of 30 ms for each of Examples and Comparative Examples.

The present invention will next be described in detail.

The water-based ink set for ink-jet recording of the present invention is comprised of at least a Bk ink, a Y ink, an M ink and a C ink.

The water-based ink set for ink-jet recording of the present invention is characterized by satisfying all the following relationships:

$$\sigma_{1000Bk} \geq 35 \text{ mN/m}; \quad (1)$$

$$|\sigma_{30Y} - \sigma_{30Bk}| \leq 5 \text{ mN/m}; \quad (2)$$

$$\sigma_{30M} \geq 30 \text{ mN/m}, \sigma_{30C} \geq 30 \text{ mN/m}; \quad (3)$$

$$\sigma_{30Y} > \sigma_{30M}, \sigma_{30Y} > \sigma_{30C}; \text{ and} \quad (4)$$

$$\sigma_{30Y} + \sigma_{30M} \leq 93 \text{ mN/m}, \sigma_{30Y} + \sigma_{30C} \leq 93 \text{ mN/m}, \quad (5)$$

wherein $\sigma_{30Bk}$, $\sigma_{30Y}$, $\sigma_{30M}$ and $\sigma_{30C}$ are the dynamic surface tension of the Bk ink, the Y ink, the M ink and the C ink, respectively, at a lifetime of 30 ms and a measurement temperature of 25° C., and $\sigma_{1000Bk}$ is the dynamic surface tension of the Bk ink at a lifetime of 1,000 ms and a measurement temperature of 25° C.

Here, the value of the dynamic surface tension is determined by a maximum bubble pressure method which is suitable for determining the surface tension at a relatively short lifetime as in the case of ink ejection. It has been known that dynamic surface tension is generally determined by an oscillating jet method, a meniscus method, a maximum bubble pressure method or other method. In the determination by mean of the maximum bubble pressure method, a gas is fed from a gas supply source to a probe to generate bubbles at the end of the probe which is immersed in an ink. At this time, the generation rate of the bubble is changed by changing the flow rate of the gas. The pressure on the bubble from the ink is changed along with the bubble generation rate change, and the surface tension is determined by the pressure change. The pressure reaches a maximum (a maximum bubble pressure) when the radius of the bubble becomes equal to the radius of the end portion of the probe. The dynamic surface tension σ of the ink at this moment is represented by the following equation:

$$\sigma = (\Delta P \cdot r)/2$$

wherein r is the radius of the end portion of the probe, and ΔP is the difference between the maximum value and the minimum value of the pressure on the bubble. The maximum value of this difference is the maximum pressure (the maximum bubble pressure) when the radius of curvature of the bubble becomes equal to the radius of the end portion of the probe.

In the present invention, the term "lifetime" shall refer to a period of time from when the bubble is separated from the probe after the pressure reaches the maximum bubble pressure to form a new surface to when the pressure again reaches the maximum bubble pressure.

In ink-jet recording, the dynamic surface tension $\sigma_{30}$ at a lifetime of 30 ms is considered to be related to the behavior of an ink which penetrates into a recording material such as recording paper in the thickness direction just after the adhesion on the recording material. If the value of this dynamic surface tension is high, the non-uniformity of ink penetrability on the surface of the recording material is likely to result in the variations of the penetration amount of the ink, thereby causing color unevenness. In addition, the dynamic surface tension $\sigma_{1000}$ at a lifetime of 1,000 ms is considered to be related to the behavior of an ink which spreads to blur on the surface of a recording material after the penetration thereinto in the thickness direction. When the value of this dynamic surface tension is low, the penetrability of the ink along the surface of the recording material is high, and blurring is likely to occur.

Accordingly, in the present invention, the blurring of the Bk ink is prevented by satisfying the following relationship.

$$\sigma_{1000Bk} \geq 35 \text{ mN/m} \quad (1)$$

Further, the penetrabilities of the Bk ink and the Y ink into a recording material in the thickness direction are adjusted relative to each other according to the following relationship;

$$|\sigma_{30Y} - \sigma_{30Bk}| \leq 5 \text{ mN/m}, \quad (2)$$

whereby the bleeding between the Bk ink and the Y ink is prevented. However, if the difference of the dynamic surface tension between these inks at a lifetime of 30 ms exceeds 5 mN/m, the ink having a higher dynamic surface tension and a lower penetrability into a recording material is drawn to a portion recorded with the ink having a lower dynamic surface tension and a higher penetrability into a recording material. Therefore, color mixing of the inks noticeably occurs toward the portion recorded with the ink having a lower dynamic surface tension and a higher penetrability into a recording material. Particularly, if the dynamic surface tension of the Y ink is excessively lower than that of the Bk ink, color mixing of the Bk ink with the Y ink occurs in a portion recorded with the Y ink, and, disadvantageously, bleeding becomes more noticeable.

In addition, in the present invention, the following relationships are satisfied.

$$\sigma_{30M} \geq 30 \text{ mN/m and } \sigma_{30C} \geq 30 \text{ mN/m}, \quad (3)$$

Therefore, a desirable meniscus is formed in a nozzle of an ink-jet head, whereby the ink can be stably ejected as an optimal fine droplet. However, if $\sigma_{30M}$ is less than 30 mN/m and $\sigma_{30C}$ is less than 30 mN/m, the inks cannot be stably ejected from a nozzle of an ink-jet head.

Moreover, the following relationship above-mentioned may result in a corresponding increase in the dynamic surface tension $\sigma_{30Bk}$ of the Bk ink at a lifetime of 30 ms.

$$\sigma_{1000Bk} \geq 35 \text{ mN/m}, \quad (1)$$

In addition, the dynamic surface tensions of the Y ink and the Bk ink at a lifetime of 30 ms are adjusted relative to each other according to the following relationship.

$$|\sigma_{30Y} - \sigma_{30Bk}| \leq 5 \text{ mN/m} \quad (2)$$

Accordingly, the dynamic surface tension of the Y ink at a lifetime of 30 ms may become high. In such a case, the penetrability of the Y ink itself is not large enough, and color unevenness could become noticeable in a portion formed by color mixing with other ink. However, in the present invention, the dynamic surface tensions of the M ink and the C ink at a lifetime of 30 ms are set lower than that of the Y ink. That is, the following relationships are satisfied.

$$\sigma_{30Y} > \sigma_{30M} \text{ and } \sigma_{30Y} > \sigma_{30C} \tag{4}$$

In addition, the following relationships are also satisfied.

$$\sigma_{30Y} + \sigma_{30M} \leq 93 \text{ mN/m and } \sigma_{30Y} + \sigma_{30C} \leq 93 \text{ mN/m}, \tag{5}$$

Thus, the overall penetrability of the inks is enhanced in a portion formed by color mixing. Therefore, according to the present invention, color unevenness in a portion formed by color mixing of color inks can be reduced.

On the contrary, if $\sigma_{30Y}$ is less than $\sigma_{30M}$ and $\sigma_{30Y}$ is less than $\sigma_{30C}$, the M and C inks each having a higher dynamic surface tension and a lower penetrability into a recording material are drawn to a portion recorded with the Y ink having a lower dynamic surface tension and a higher penetrability into a recording material. Therefore, color mixing of the M and C inks occurs toward the portion recorded with the Y ink, and, disadvantageously, bleeding between the Y ink and the M ink and bleeding between the Y ink and the C ink become more noticeable. Further, if the sum of "$\sigma_{30Y} + \sigma_{30M}$" greater than 93 mN/m and the sum of "$\sigma_{30Y} + \sigma_{30C}$" is greater than 93 mN/m, the overall penetrability of color inks in a portion formed by color mixing is not large enough, and, disadvantageously, color unevenness becomes noticeable.

Moreover, in addition to the Bk, Y, M and C inks, inks each having a coloring agent concentration different from that of a corresponding one of the Bk, Y, M and C inks may be combined in the ink set. For these combinations of the inks, it is sufficient that at least one of the Bk, Y, M or C ink and the corresponding ink having a different coloring agent concentration satisfy all the above relationships (1) to (5).

Each of the inks constituting the water-based ink set for ink-jet recording of the present invention comprises at least water, a coloring agent such as a dye or a pigment and a penetrant, and the composition of the ink is adjusted such that the ink has a predetermined dynamic surface tension.

In order to prevent clogging of a nozzle, a filter and the like caused by impurities contained in water, the water contained in each of the inks is not ordinary tap water but preferably high purity water such as ion-exchanged water, distilled water or ultrapure water. In each of the inks, the amount of the water with respect to the total weight of the each of the inks is preferably about 10 wt. % to about 98 wt. %, more preferably about 30 wt. % to about 97 wt. %, and most preferably about 40 wt. % to about 95 wt. %.

The coloring agent contained in each of the inks does not cause any problem even when the coloring agent is any of a dye or a pigment. However, generally, the Bk ink is frequently employed when text data including letters, symbols and ruled lines is printed on a recording material. Upon printing, there is a strong demand for improving the visibility of the text by preventing blurring and bleeding for enhancing the sharpness and contrast in edge portions of the text. In addition, there is a demand for improving water resistance and light fastness. Thus, in order to meet these demands, a pigment is preferably employed as the coloring agent. On the other hand, the color inks such as the Y, M and C inks are frequently employed for printing graphic data or the like. Preferably, in order for colors to be fully developed and for a color print portion to have vivid colors, a dye is employed as the coloring agent.

Dyes which can be employed in each of the inks include a water-soluble dye typified by a direct dye, an acid dye, a basic dye, a reactive dye and the like. Examples of the dye which satisfies vividness, water solubility, stability, light fastness and other properties required for each of the inks include, but are not limited to: direct dyes such as Color Index (hereinafter referred to as C. I.) Direct Blacks 17, 19, 32, 51, 71, 108, 146, 154 and 168, C. I. Direct Blues 6, 22, 25, 71, 86, 90, 106 and 199, C. I. Direct Reds 1, 4, 17, 28, 83 and 227, C. I. Direct Yellows 12, 24, 26, 86, 98, 132 and 142, C. I. Direct Oranges 34, 39, 44, 46 and 60, C. I. Direct Violets 47 and 48, C. I. Direct Brown 109, C. I. Direct Green 59, and the like; acid dyes such as C. I. Acid Blacks 2, 7, 24, 26, 31, 52, 63, 112 and 118, C. I. Acid Blues 9, 22, 40, 59, 93, 102, 104, 113, 117, 120, 167, 229 and 234, C. I. Acid Reds 1, 6, 32, 37, 51, 52, 80, 85, 87, 92, 94, 115, 181, 256, 289, 315 and 317, C. I. Acid Yellows 11, 17, 23, 25, 29, 42, 61 and 71, C. I. Acid Oranges 7 and 19, C. I. Acid Violet 49, and the like; basic dyes such as C. I. Basic Black 2, C. I. Basic Blues 1, 3, 5, 7, 9, 24, 25, 26, 28 and 29, C. I. Basic Reds 1, 2, 9, 12, 13, 14 and 37, C. I. Basic Violets 7, 14 and 27, and the like; reactive dyes such as C. I. Reactive Blues 2, 5, 7, 12, 13, 14, 15, 17, 18, 19, 20, 21, 25, 27, 28, 37, 38, 40, 41 and 71, C. I. Reactive Reds 6, 7, 11, 12, 15, 17, 21, 23, 24, 35, 36, 42, 63, 66 and 180, C. I. Reactive Yellows 1, 2, 3, 13, 14, 15 and 17, C. I. Reactive Oranges 2, 5, 7, 16, 20 and 24, C. I. Reactive Violets 2, 4, 5, 8 and 9, C. I. Reactive Browns 1, 7 and 16, C. I. Reactive Greens 5 and 7, and the like; Food Blacks 1 and 2; and the like. An ink having a desired color can be obtained by use of one or more of these dyes.

Carbon black, an inorganic pigment and an organic pigment may be employed as the pigment. Examples of the pigment include: azo pigments such as azo lakes, insoluble azo pigments, condensed azo pigments and chelate azo pigments; polycyclic pigments such as phthalocyanine pigments, perylene pigments, perinone pigments, anthraquinone pigments, quinacridone pigments, dioxazine pigments, thioindigo pigments, isoindolinone pigments and quinophthalone pigments; dye lake pigments such as basic dye type lake pigments and acidic dye type lake pigments; organic pigments such as nitro pigments and nitroso pigments; inorganic pigments such as titanium oxide based pigments, iron oxide based pigments, and carbon black based pigments; and the like. Further, any other pigment may be employed so long as it can disperse in an aqueous phase. Specific examples of such a pigment include, but are not limited to: C. I. Pigment Blacks 1 and 7; C. I. Pigment Blues 2, 3, 15, 16, 22 and 25; C. I. Pigment Reds 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123 and 163; C. I. Pigment Yellows 1, 2, 3, 4, 5, 6, 7, 10, 11, 12, 13, 14, 15, 16, 17, 65, 74 and 83; and the like. An ink having a desired color can be obtained by use of one or more of these pigments.

In addition, a self-dispersing type pigment, such as grafted carbon, may be employed which is obtained by subjecting a pigment to a surface treatment by use of a surfactant or a polymer dispersing agent. A commercial product may be employed as the self-dispersing type pigment. Examples of the commercial product include, but are not limited to, carbon black, CAB-O-JET (a registered trademark) 200, 250, 260, 300 and 700 (products of Cabot Specialty Chemicals, Inc.), BONJET (a registered trademark) BLACK CW-1, CW-2 and CW-3 (products of Orient Chemical Industries, Ltd.) and the like.

The total amount of the coloring agents contained in each of the inks with respect to the total weight of the each of the inks is about 0.1 wt. % to about 20 wt. %, preferably about 0.3 wt. % to about 15 wt. %, and more preferably about 0.5 wt. % to about 10 wt. %. If the amount is less than 0.1 wt. %, the color fading rate of the ink on a recording material is significantly increased. Therefore, color balance is not kept, and a sufficient print density cannot be obtained. Further, for the case of the dye, if the amount exceeds about 20 wt. %, the dye may not sufficiently dissolve in the ink composition to cause precipitation of the dye. For the case of the pigment, if the amount exceeds about 20 wt. %, difficulty arises in maintaining high dispersion stability. Thus, both the cases are not preferable.

The penetrant reduces the dynamic surface tension of each of the inks and moderately enhances the ink penetration rate into a recording material such as paper. Therefore, bleeding and color unevenness are prevented, and the rapid drying properties of the ink on a recording material are improved. Preferably, a penetrant is selected which moderately enhances the ink penetration rate into a recording material and which hardly causes blurring due to ink penetration. For example, a polyhydric alcohol alkyl ether having a low odor and a low vapor pressure is employed. Specific examples of the polyhydric alcohol alkyl ether include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like. These may be employed alone or as a mixture of two or more.

The amount of the penetrant in each of the inks with respect to the total weight of the each of the inks is about 0.1 wt. % to about 20 wt. %, and preferably about 0.1 wt. % to about 15 wt. %. Generally, if the amount is less than about 0.1 wt. %, the dynamic surface tension becomes excessively high, and the penetration rate of the ink into a recording material becomes low, thereby causing problems in drying time and of bleeding. If the amount exceeds about 20 wt. %, the dynamic surface tension becomes excessively low, and the ink excessively penetrates into a recording material. Thus, disadvantageously, the ink reaches the back surface of the recording material, and blurring occurs considerably.

To each of the inks, a humectant may be optionally added for preventing drying of the ink at a nozzle of a head of a printer employing an ink-jet recording method and for improving the solution stability of the ink. Specific examples of the humectant include, but are not limited to: polyhydric alcohols such as ethylene glycol, propylene glycol, diethylene glycol, triethylene glycol, dipropylene glycol, polyethylene glycol, polypropylene glycol, 1,3-butanediol, 1,5-pentandiol, 1,6-hexanediol, glycerin, 1,2,6-hexanetriol, 1,2,4-butanetriol, 1,2,3-butanetriol, and the like; nitrogen-containing heterocyclic compounds such as N-methyl-2-pyrrolidone, N-hydroxyethyl-2-pyrrolidone, 2-pyrrolidone, 1,3-dimethylimidazolidinone, ε-caprolactam, and the like; amides such as formamide, N-methylformamide, N,N-dimethylformamide, and the like; amines such as ethanolamine, diethanolamine, triethanolamine, ethylamine, diethylamine, triethylamine, and the like; sulfur-containing compounds such as dimethyl sulfoxide, sulfolane, thiodiethanol, and the like; and the like. These may be employed alone or as a mixture of two or more.

The amount of the humectant in each of the inks depends on the composition of the ink and the desired ink characteristics and is determined over a wide range. Normally, the amount of the humectant with respect to the total weight of each of the inks is preferably 0 wt. % to about 40 wt. %, and more preferably 0 wt. % to about 30 wt. %. The amount exceeding about 40 wt. % is not preferable since the viscosity of the ink unnecessarily increases to potentially cause problems such as difficulty in ejecting the ink from a nozzle of an ink-jet head and significant retardation of drying on a recording material.

In addition, a monohydric alcohol such as ethanol or isopropyl alcohol may be employed for the purpose of controlling the penetrability of the ink into a recording material and the drying characteristics of the ink.

Each of the inks constituting the water-based ink set for ink-jet recording of the present invention comprises water, a coloring agent and a penetrant. In addition to the above components, generally employed additives such as a dispersing agent, a viscosity modifier, a surfactant, a pH modifier and a preservative-mildewproofing agent as well as the humectant and the monohydric alcohol as mentioned above may be added to the ink as an optional component in accordance with need. Moreover, if the inks are applied to an ink-jet method of a type utilizing the action of thermal energy for ejecting the ink, an additive for adjusting thermal physical properties such as specific heat, thermal expansion coefficient and thermal conductivity may be employed.

EXAMPLES

The present invention will next be specifically described by way of examples.

(1) Preparation of Inks and Measurement of Dynamic Surface Tension

Each of the inks to be employed in Examples and Comparative Examples was prepared as follows.

A Bk-1 ink contains 35 wt. % of CAB-O-JET (a registered trademark) 300 (a coloring agent solid concentration of 15%, product of Cabot Specialty Chemicals, Inc.) serving as the coloring agent, 21.5 wt. % of glycerin serving as the humectant, 1.0 wt. % of dipropylene glycol propyl ether serving as the penetrant and 0.1 wt. % of SUNNOL (a registered trademark) DL-1430 (product of LION Corporation) serving as the surfactant, with the balance being ultrapure water. The Bk-1 ink was obtained by sufficiently stirring and mixing the above components.

According to the compositions listed in Table 1, Bk-2 to Bk-5 inks, Y-1 to Y-7 inks, M-1 to M-4 inks and C-1 to C-4 inks were prepared as similarly in the case of preparing the Bk-1 ink. The solid concentration of the coloring agent with respect to the total ink amount was 5.25 wt % for the Bk-1 and Bk-3 to Bk-5 inks.

The dynamic surface tension of each of the inks was determined under conditions of lifetimes of 20 ms to 5,000 ms and a measurement temperature of 25° C. by means of an automatic dynamic surface tension meter BP-D4 (product of Kyowa Interface Science Co., Ltd.) . The values of the dynamic surface tension at lifetimes of 30 ms and 1,000 ms are shown in Table 1.

TABLE 1

|  |  | Bk-1 | Bk-2 | Bk-3 | Bk-4 | Bk-5 | Y-1 | Y-2 | Y-3 | Y-4 | Y-5 |
|---|---|---|---|---|---|---|---|---|---|---|---|
| Ink Composition (wt. %) | CAB-O-JET ® 300 | 35.0 |  | 35.0 | 35.0 | 35.0 |  |  |  |  |  |
|  | C.I. Direct Black 154 |  | 3.0 |  |  |  |  |  |  |  |  |
|  | C.I. Direct Yellow 86 |  |  |  |  |  |  | 2.0 | 2.0 |  | 2.0 |
|  | C.I. Direct Yellow 132 |  |  |  |  |  | 2.5 |  |  | 2.5 |  |
|  | C.I. Direct Red 227 |  |  |  |  |  |  |  |  |  |  |
|  | C.I. Direct Blue 199 |  |  |  |  |  |  |  |  |  |  |
|  | Glycerin | 21.5 | 25.0 | 21.5 | 21.5 | 20.5 | 30.5 | 30.5 | 30.5 | 30.5 | 29.0 |
|  | Dipropylene glycol propyl ether | 1.0 |  | 1.0 |  |  | 1.0 |  | 1.0 | 0.5 | 1.0 |
|  | Triethylene glycol butyl ether |  | 4.5 |  | 1.0 | 4.5 |  | 2.0 |  |  | 2.0 |
|  | SUNNOL ® DL-1430 | 0.1 |  | 0.2 | 0.1 | 0.2 | 0.1 | 0.1 | 0.2 | 0.1 | 0.1 |
|  | OLFINE ® E1010 |  | 0.5 |  |  |  |  |  |  |  |  |
|  | ETHOMEEN ® C/15 |  |  |  |  |  |  |  |  |  |  |
|  | Ultrapure water | *1 | *1 | *1 | *1 | *1 | *1 | *1 | *1 | *1 | *1 |
| Dynamic surface tension σ (mN/m) | 30 ms | 47 | 37 | 46 | 52 | 41 | 49 | 48 | 47 | 54 | 44 |
|  | 1000 ms | 42 | 33 | 40 | 43 | 36 | 42 | 42 | 39 | 44 | 39 |

|  |  | Y-6 | Y-7 | M-1 | M-2 | M-3 | M-4 | C-1 | C-2 | C-3 | C-4 |
|---|---|---|---|---|---|---|---|---|---|---|---|
| Ink Composition (wt. %) | CAB-O-JET ® 300 |  |  |  |  |  |  |  |  |  |  |
|  | C.I. Direct Black 154 |  |  |  |  |  |  |  |  |  |  |
|  | C.I. Direct Yellow 86 |  |  |  |  |  |  |  |  |  |  |
|  | C.I. Direct Yellow 132 | 2.5 | 2.5 |  |  |  |  |  |  |  |  |
|  | C.I. Direct Red 227 |  |  | 3.0 | 3.0 | 3.0 | 3.0 |  |  |  |  |
|  | C.I. Direct Blue 199 |  |  |  |  |  |  | 3.0 | 3.0 | 3.0 | 3.0 |
|  | Glycerin | 26.5 | 25.0 | 30.5 | 30.5 | 30.5 | 30.5 | 30.5 | 30.5 | 30.5 | 30.5 |
|  | Dipropylene glycol propyl ether |  |  |  |  |  |  |  |  |  |  |
|  | Triethylene glycol butyl ether | 4.5 | 4.5 | 4.5 | 4.5 | 2.0 | 4.5 | 4.5 | 4.5 | 1.0 | 4.5 |
|  | SUNNOL ® DL-1430 | 0.1 |  | 0.1 |  | 0.1 |  | 0.1 |  | 0.1 |  |
|  | OLFINE ® E1010 |  | 1.5 |  |  |  | 1.5 |  |  |  | 1.5 |
|  | ETHOMEEN ® C/15 |  |  |  | 0.2 |  |  |  | 0.2 |  |  |
|  | Ultrapure water | *1 | *1 | *1 | *1 | *1 | *1 | *1 | *1 | *1 | *1 |
| Dynamic surface tension σ (mN/m) | 30 ms | 43 | 36 | 42 | 40 | 48 | 33 | 41 | 40 | 52 | 34 |
|  | 1000 ms | 39 | 33 | 39 | 34 | 40 | 30 | 36 | 33 | 43 | 32 |

*1: Balance
*CAB-O-JET ® 300: product of Cabot Specialty Chemicals, Inc., coloring agent solid concentration = 15 wt. %
*SUNNOL DL-1430: surfactant, product of Lion Corporation
*OLFINE ® E1010: surfactant, product of Nissin Chemical Industry Co., Ltd.; ethylene oxide (10 mol) adduct of acetylene diol
ETHOMEEN ® C/15: surfactant, product of Lion Corporation (2) Examples 1 to 10 and Comparative Examples 1 to 3: Configuration of Ink Sets The Bk, Y, M and C inks each prepared by the above method were combined as shown in Table 2 to configure the ink sets of Examples 1 to 10 and Comparative Examples 1 to 3.

(3) Evaluation

Each of the inks of the ink sets for each of Examples 1 to 10 and Comparative Examples 1 to 3 was filled into a predetermined ink cartridge, and a predetermined pattern sample was printed by use of a digital multifunction device equipped with an ink-jet printer (MFC-3100C, product of Brother Industries, Ltd.). Subsequently, (a) evaluation of blurring, (b) evaluation of bleeding, (c) evaluation of color unevenness in a portion formed by color mixing of the Y and M inks (a red portion) and in a portion formed by color mixing of the Y and C inks (a green portion), and (d) overall evaluation were performed as follows.

(a) Evaluation of Blurring

As an evaluation pattern sample, letters in black color were printed without any background, and irregularities of lines caused by blurring of ink and readability of the letters were evaluated by the following criteria. In this case, the font size of the letters was set to 11, and ordinary paper (4200DP PAPER 20LB, product of FUJI XEROX OFFICE SUPPLY) was employed as recording paper.

A: Almost no blurring is found, and the letters are sharp.

B: Blurring evidently occurs, but the letters are readable.

(b) Evaluation of Bleeding (b-1) Evaluation of Bleeding Between a Black Portion and a Yellow Portion (Y/Bk)

As an evaluation pattern sample, an image was printed by use of a color combination of black color and yellow color serving as a color for letters and a color for a background, respectively. Further, as a control pattern sample, letters in black color and yellow color were printed without any background. In these cases, the font size of the letters was set to 11, and ordinary paper (4200DP PAPER 20LB, product of FUJI XEROX OFFICE SUPPLY) was employed as recording paper.

The evaluation was performed by comparing the letters on the background with the letters without the background through visual observation. According to the extent of bleeding on the boundary at which colors are mixed and the readability of the letters, bleeding was evaluated by the following criteria.

AA: Almost no bleeding is found, and the sharpness of the letters is the same level as that of the letters without the background.

A: Bleeding occurs to a slight extent as compared to the case of the letters without the background, but the letters are satisfactorily readable.

B: Bleeding evidently occurs as compared to the case of the letters without the background, and the letters are hard to read.

(b-2) Evaluation of Bleeding Between a Yellow Portion and a Magenta Portion (Y/M) and Between a Yellow Portion and a Cyan Portion (Y/C)

As an evaluation pattern sample, an image was printed by use of a color combination of yellow color and magenta color serving as a color for letters and a color for a background, respectively, and a color combination of yellow color and cyan color serving as a color for letters and a color for a background, respectively. Further, as a control pattern sample, letters in yellow, magenta and cyan colors were printed without any background. In these cases, the font size of the letters was set to 11, and ordinary paper (4200DP PAPER 20LB, product of FUJI XEROX OFFICE SUPPLY) was employed as recording paper.

The evaluation was performed by comparing the letters on the background with the letters without the background through visual observation. According to the extent of bleeding on the boundary at which colors are mixed and the readability of the letters, bleeding was evaluated by the following criteria.

A: For both the combinations, almost no bleeding is found, and the sharpness of the letters is the same level as that of the letters without the background.

B: In at least one of the combinations, bleeding evidently occurs as compared to the case of the letters without the background, and the letters are hard to read.

(c) Evaluation of Color Unevenness

As a pattern sample for color unevenness evaluation, a pattern was printed on ordinary paper (4200DP PAPER 20LB, product of FUJI XEROX OFFICE SUPPLY). The pattern had a portion formed by color mixing, which portion was printed by use of an ink mixing ratio of 1:1 and had a size of 3 cm length and 3 cm width. A portion formed by color mixing of the Y and M inks (the red portion) and a portion formed by color mixing of the Y and C inks (the green portion) were visually observed from a distance of about 30 cm, and the uniformity of colors was evaluated. The evaluation criteria are as follows.

A: Color unevenness is almost unnoticeable in the portion formed by color mixing.

B: Color unevenness evidently occurs in the portion formed by color mixing.

(d) Overall Evaluation

Overall evaluation was performed by the following criteria.

A: all the evaluation results for blurring, bleeding and color unevenness are AA or A.

B: the evaluation results for blurring, bleeding and color unevenness contain B.

Figure 2:
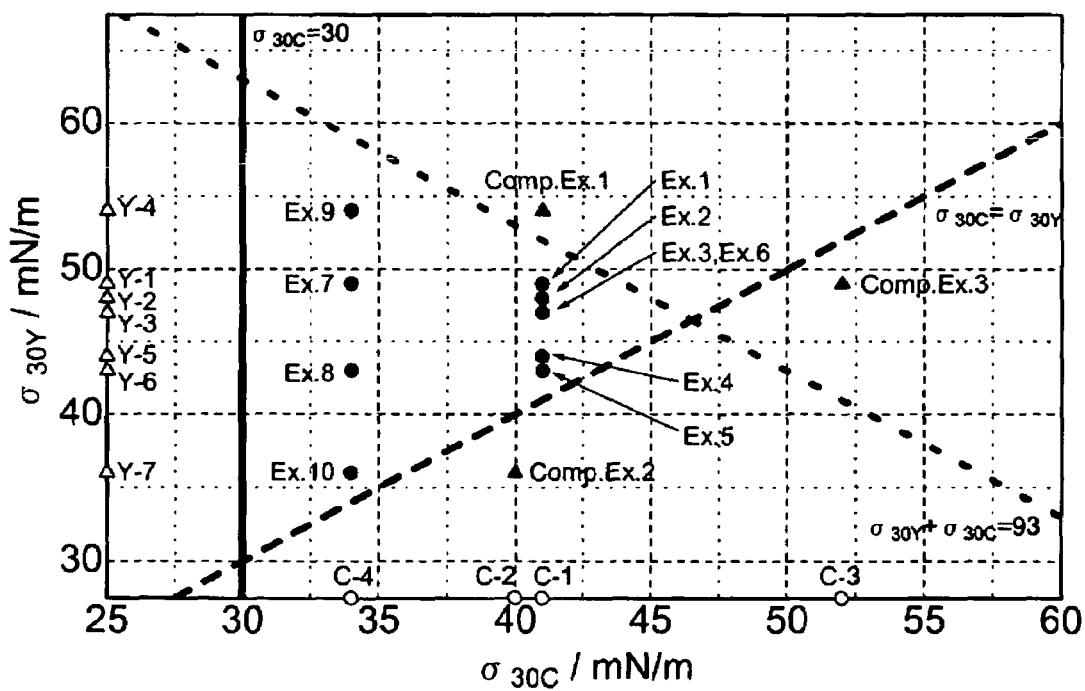
FIG. 2 is a graph showing the dynamic surface tensions of the Y ink and a C ink at a lifetime of 30 ms for each of the Examples and Comparative Examples.

These evaluation results are shown in Table 2. The dynamic surface tensions of the Y ink and the M ink at a lifetime of 30 ms for each of the Examples and Comparative Examples are plotted in FIG. 1. In addition, the dynamic surface tensions of the Y ink and the C ink at a lifetime of 30 ms for each of the Examples and Comparative Examples are plotted in FIG. 2.

TABLE 2

| | | Ex. 1 | Ex. 2 | Ex. 3 | Ex. 4 | EX. 5 | Ex. 6 | Ex. 7 | Ex. 8 | Ex. 9 | Ex. 10 | Comp. Ex. 1 | Comp. Ex. 2 | Comp. Ex. 3 |
|---|---|---|---|---|---|---|---|---|---|---|---|---|---|---|
| | Bk ink | Bk-1 | Bk-1 | Bk-1 | Bk-1 | Bk-1 | Bk-3 | Bk-1 | Bk-1 | Bk-4 | Bk-5 | Bk-1 | Bk-2 | Bk-1 |
| | Y ink | Y-1 | Y-2 | Y-3 | Y-5 | Y-6 | Y-3 | Y-1 | Y-6 | Y-4 | Y-7 | Y-4 | Y-7 | Y-1 |
| | M ink | M-1 | M-1 | M-1 | M-1 | M-1 | M-1 | M-4 | M-4 | M-4 | M-4 | M-1 | M-2 | M-3 |
| | C ink | C-1 | C-1 | C-1 | C-1 | C-1 | C-1 | C-4 | C-4 | C-4 | C-4 | C-1 | C-2 | C-3 |
| Dynamic surface tension $\sigma_{1000Bk}$ (mN/m) | | 42 | 42 | 42 | 42 | 42 | 40 | 42 | 42 | 43 | 36 | 42 | 33 | 42 |
| $\sigma_{30Y} - \sigma_{30Bk}$ (mN/m) | | 2 | 1 | 0 | -3 | -4 | 1 | 2 | -4 | 2 | -5 | 7 | -1 | 2 |
| $\sigma_{30Y} - \sigma_{30M}$ (mN/m) | | 7 | 6 | 5 | 2 | 1 | 5 | 16 | 10 | 21 | 3 | 12 | -4 | 1 |
| $\sigma_{30Y} - \sigma_{30C}$ (mN/m) | | 8 | 7 | 6 | 3 | 2 | 6 | 15 | 9 | 20 | 2 | 13 | -4 | -3 |
| $\sigma_{30Y} + \sigma_{30M}$ (mN/m) | | 91 | 90 | 89 | 86 | 85 | 89 | 82 | 76 | 87 | 69 | 96 | 76 | 97 |
| $\sigma_{30Y} + \sigma_{30C}$ (mN/m) | | 90 | 89 | 88 | 85 | 84 | 88 | 83 | 77 | 88 | 70 | 95 | 76 | 101 |
| Blurring | | A | A | A | A | A | A | A | A | A | A | A | B | A |
| Bleeding | Y/Bk | AA | AA | AA | AA | A | AA | AA | A | AA | A | B | A | A |
| | Y/M, Y/C | A | A | A | A | A | A | A | A | A | A | A | B | B |
| Color unevenness | Red portion | A | A | A | A | A | A | A | A | A | A | B | A | B |
| | Green portion | A | A | A | A | A | A | A | A | A | A | B | A | B |
| Overall evaluation | | A | A | A | A | A | A | A | A | A | A | B | B | B |

As can be seen from the above, in the water-based ink sets for ink-jet recording of Examples 1 to 10, the relationship "$\sigma_{1000Bk} \geq 35$ mN/m" prevents blurring of black color, and the relationship "$|\sigma_{30Y}-\sigma_{30Bk}| \leq 5$ mN/m" prevents bleeding on the boundary between the black portion and the yellow portion. The relationship "$\sigma_{30Y}>\sigma_{30C}$" prevents bleeding on the boundary between the yellow portion and the magenta portion, and the relationship "$\sigma_{30Y}>\sigma_{30C}$" prevents bleeding on the boundary between the yellow portion and the cyan portion. The relationship "$\sigma_{30Y}+\sigma_{30M} \leq 93$ mN/m" prevents color unevenness in the portion formed by color mixing of the Y and M inks (the red portion), and similarly the relationship "$\sigma_{30Y}+\sigma_{30C} \leq 93$ mN/m" prevents color unevenness in the portion formed by color mixing of the Y and C inks (the green portion). Further, the relationships "$\sigma_{30M} \geq 30$ mN/m and $\sigma_{30C} \geq 30$ mN/m" provide ejection stability to the inks. Thus, the ink sets having excellent print quality were obtained.

On the other hand, in the water-based ink set for ink-jet recording of Comparative Example 1, since the value of "$|\sigma_{30Y}-\sigma_{30Bk}|$" exceeds 5 mN/m, bleeding between black color and yellow color was found to occur. Further, since the value of "$\sigma_{30Y}+\sigma_{30M}$" exceeds 93 mN/m, color unevenness was found to occur in the red portion. In addition, since the value of "$\sigma_{30Y}+\sigma_{30C}$" exceeds 93 mN/m, color unevenness was also found to occur in the green portion.

In the water-based ink set for ink-jet recording of Comparative Example 2, since the value of "$\sigma_{1000Bk}$" is less than 35 mN/m, blurring of black color was found to occur. Further, since "$\sigma_{30Y}<\sigma_{30M}$ and $\sigma_{30Y}<\sigma_{30C}$", bleeding was found to occur between yellow color and magenta color and between yellow color and cyan color.

In the water-based ink set for ink-jet recording of Comparative Example 3, since $\sigma_{30Y}<\sigma_{30C}$, bleeding between yellow color and cyan color was found to occur. Further, color unevenness was found to occur in the red portion since the value of "$\sigma_{30Y}+\sigma_{30M}$" exceeds 93 mN/m, and color unevenness was also found to occur in the green portion since the value of "$\sigma_{30Y}+\sigma_{30C}$" exceeds 93 mN/m.

The water-based ink set for ink-jet recording of the present invention is useful in a printer employing an ink-jet recording method when sharp text data without blurring and bleeding is printed by use of a Bk ink and a high quality image having reduced color unevenness is printed by use of color inks.

The entire disclosures of the specifications, claims, summaries and drawings of Japanese Patent Application Nos. 2005-216146 and 2006-74339 filed on Jul. 26, 2005 and Mar. 17, 2006, respectively, are hereby incorporated by reference.

What is claimed is:

1. A water-based ink set for ink-jet recording, comprising a black ink, a yellow ink, a magenta ink and a cyan ink, wherein dynamic surface tensions of each ink as determined by the maximum bubble pressure method at a measurement temperature of 25° C. satisfy the following relationships:

$$\sigma_{1000Bk} \geq 35 \text{ mN/m}; \quad (1)$$

$$|\sigma_{30Y}-\sigma_{30Bk}| \leq 5 \text{ mN/m}; \quad (2)$$

$$\sigma_{30M} \geq 30 \text{ mN/m}, \sigma_{30C} \geq 30 \text{ mN/m}; \quad (3)$$

$$\sigma_{30Y}>\sigma_{30M}, \sigma_{30Y}>\sigma_{30C}; \text{ and} \quad (4)$$

$$\sigma_{30Y}+\sigma_{30M} \leq 93 \text{ mN/m}, \sigma_{30Y}+\sigma_{30C} \leq 93 \text{ mN/m}, \quad (5)$$

wherein $\sigma_{30Bk}$, $\sigma_{30Y}$, $\sigma_{30M}$ and $\sigma_{30C}$ are dynamic surface tensions of the blank ink, the yellow ink, the magenta ink, and the cyan ink, respectively at a lifetime of 30 ms, and $\sigma_{1000Bk}$ is a dynamic surface tension of the black ink at a lifetime of 1,000 ms.

2. The water-based ink set for ink-jet recording according to claim 1, wherein each of the black ink, the yellow ink, the magenta ink, and the cyan ink comprises water, a coloring agent, and a penetrant.

3. The water-based ink set for ink-jet recording according to claim 2, wherein the coloring agent in the black ink comprises a pigment.

4. The water-based ink set for ink-jet recording according to claim 2, wherein each ink comprises a coloring agent in an amount of about 0.1 wt. % to about 20 wt. %.

5. The water-based ink set for ink-jet recording according to claim 2, wherein each ink comprises the penetrant in an amount of 0.1 wt. % to 20 wt. %.

6. The water-based ink set for recording ink-jet according to claim 2, wherein, the penetrant comprises a polyhydric alcohol alkyl ether.

7. The water-based ink set for ink-jet recording according to claim 1, wherein each ink comprises a humectant in an amount of at most 40 wt. %.

8. The water-based ink set for ink-jet recording according to claim 7, wherein the humectant is selected from the group consisting of polyhydric alcohols, nitrogen-containing heterocyclic compounds, amides, amines, sulfur-containing compounds, and any combinations thereof.

9. The water-based ink set for ink-jet recording according to claim 7, wherein the humectant is selected from the group consisting of ethylene glycol, propylene glycol, diethylene glycol, triethylene glycol, diporpylene glycol, polyethylene glycol, polypropylene glycol, 1,3-butanediol, 1,5-pentadial, 1,-6-hexadiol, glycerin, 1,2,6-hexatriol, 1,2,4-butanetriol, 1,2,3-butanetriol, N-methyl-2-pyrrolidone, 1,3-dimethyl-limidazoliddinone, ϵ-caprolaetam, formamide, N-methylformainide, N,N-dimethylformamide, ethanolamine, diethanolamine, triethanolamine, ethylamine, diethylamine, triethylamine, dimetyl sulfoxie, sulfolane, thiodiethanol, and any combinations thereof.

10. The water-based ink set for ink-jet recording according to claim 6, wherein the polyhydric alcohol alkyl ether is selected from the group consisting of diethylene glycol methyl ether, diethylene glycol butyl ether, diethylene glycol isobutyl ether, diporpylene glycol methyl ether, dipropylene glycol propyl ether, dipropylene glycol isopropyl ether, dipropylene glycol butyl ether, triethylene glycol methyl ether, triethylene glycol burl ether, tripropylene glycol methyl ether, tryporpylene glycol butyl ether, and any combinations thereof.

11. The water-based ink set for ink-jet recording according to claim 2, wherein the coloring agent of the yellow ink comprises a dye.

12. The water-based ink set for ink-jet recording according to claim 2, wherein the coloring agent of the magenta ink comprises a dye.

13. The water-based ink set for ink-jet recording according to claim 2, wherein the coloring agent of the cyan ink comprises a dye.

14. A method of ink-jet recording comprising the step of:
applying a water-based ink set to a recording material using an ink-jet printer,
wherein the water-based ink set comprises:
a black ink, a yellow ink, a magenta ink and a cyan ink, wherein dynamic surface tensions of each ink as determined by the maximum bubble pressure method at a measurement temperature of 2520 C. satisfy the following relationships:

$$\sigma_{1000Bk} \geq 35 \text{ mN/m}; \quad (1)$$

$$|\sigma_{30Y}-\sigma_{30Bk}| \leq 5 \text{ mN/m}; \quad (2)$$

$$\sigma_{30M} 30 \text{ mN/m}, \sigma_{30C} \geq 30 \text{ mN/m}; \quad (3)$$

$$\sigma_{30Y} >_{30}M, \sigma_{30Y} > \sigma_{30C}; \text{ and} \quad (4)$$

$$\sigma_{30Y} +_{30M} \leq 93 \text{ mN/m}, \sigma_{30Y} + \sigma_{30C} \leq 93 \text{ mN/m}, \quad (5)$$

wherein $\sigma_{30Bk}$, $\sigma_{30Y}$, $\sigma_{30M}$ and $\sigma_{30C}$ are dynamic surface tensions of the blank ink, the yellow ink, the magenta ink, and the cyan ink, respectively at a lifetime of 30 ms, and $\sigma_{1000Bk}$ is a dynamic surface tension of the black ink at a lifetime of 1,000 ms.

15. The method of ink-jet recording according to claim 14, wherein the step of applying comprises forming an image comprising text data and graphic data using the water-based ink set.

16. The method of ink-jet recording according to claim 14, wherein the step of applying comprises printing text in which almost no bluffing is found and letters are sharp using the water-based ink set.

17. The method of ink-jet recording according to claim 14, wherein the step of applying comprises printing text and a color background in which almost no bleed in found and the sharpness of letters is the same level as that of letters without the background.

18. The method of ink-jet recording according to claim 14, wherein the step of applying comprises printing a pattern having a portion formed by color mixing in which color unevenness is almost unnoticeable in the portion formed by color mixing.

19. The water-based ink set for ink-jet recording according to claim 2, wherein the coloring agent in the black ink consists essentially of a pigment, and the coloring agent in each of the yellow ink, the magenta ink, and the cyan ink consists essentially of a dye.

* * * * *